United States Patent
Kao

[11] Patent Number: 5,873,458
[45] Date of Patent: Feb. 23, 1999

[54] DRAWER TYPE CD BOX STRUCTURE

[76] Inventor: Kuo-Min Kao, 23F-3, No. 508, Sec. 5, Chung-Hsiao E. Rd., Taipei, Taiwan

[21] Appl. No.: 928,753

[22] Filed: Sep. 12, 1997

[51] Int. Cl.[6] .................................................. B65D 85/57
[52] U.S. Cl. .................. 206/308.1; 312/9.55; 312/334.1
[58] Field of Search .............................. 206/307.1, 308.1, 206/387.12, 387.14; 312/9.47, 9.53–9.57, 332, 334.1–334.3, 334.6–334.22

[56] References Cited

U.S. PATENT DOCUMENTS

| | | | |
|---|---|---|---|
| 3,087,771 | 4/1963 | Pari | 312/334.21 |
| 3,995,927 | 12/1976 | Stein | 312/334.19 |
| 4,065,196 | 12/1977 | Stein | 312/334.19 |
| 4,384,746 | 5/1983 | Ferdinand et al. | 312/334.7 |
| 4,440,458 | 4/1984 | Berkman | 206/307.1 |
| 4,960,205 | 10/1990 | Wang | 206/307.1 |
| 5,040,856 | 8/1991 | Wilkins et al. | 312/334.21 |
| 5,484,198 | 1/1996 | Pilliod | 312/334.21 |
| 5,647,649 | 7/1997 | Kao | 206/387.12 |

*Primary Examiner*—Jim Foster
*Attorney, Agent, or Firm*—Varndell Legal Group

[57] ABSTRACT

A CD storage box formed by a box with a slidable drawer contained therein. The drawer is formed by combining a base plate having a receiving space and a drawer panel. The base plate can be used to hold bare CDs and other media. The sliding slot on the two sides of the base plate and a sliding bar secured within the box are arranged so that the drawer may slide forwards and backwards but will not fall out of the box.

3 Claims, 7 Drawing Sheets

DRAWER TYPE CD BOX STRUCTURE

BACKGROUND OF THE INVENTION

1. Field of the Invention

The present invention relates to a dust-proof drawer type CD box structure where the drawer travels steadily on a track. The dust-proof drawer type CD box structure of the present invention can be used to preserve and organize CDs, disks, audio tapes, video tapes and others.

2. Description of the Prior Art

Information media of the past, such as books, magazines and TV are being replaced by CDs having audio and visual effects, disks, audio tapes, and video tapes. The new media is easy to obtain and use, and a box for preserving CDs, disks, audio tapes, video tapes, etc. is necessary for users.

However, a tightly sealed box can have a drawer that is easily disengaged from a sliding track by an applied pulling force thereto, so that the contents within the box will be dispersed on the ground. Further, such a box may only store CDs in a case. If the case of the CD is destroyed or lost, then the CD cannot be stored in the box, which is not an ideal design.

SUMMARY OF THE INVENTION

The main object of the present invention is to provide a dust-proof, secure drawer type CD box structure. By a new design of a track and a drawer base plate structure, the drawer can be quickly assembled and when the drawer is open, it will not drop out of the box due to travel over the end of the track. Another object of the present invention is to provide a drawer type CD box structure that can store media other than the CD cases, such as the CDs themselves on a tunable support, other disks, audio tapes, and video tapes.

In order to achieve the aforesaid objects, the present invention provides a drawer type CD box structure mainly formed by a box engaged with a drawer. The drawer is formed by a drawer panel and a base plate that has a receiving space, and the base plate can be used to engaged with a plurality of tunable supports. The drawer can slide forwards and backwards and will not drop from the track by the arrangement of a sliding slot on the two sides of the base plate and the sliding bar within the box, wherein a half notch on the distal end of the sliding slot engages the sliding bar inside the box body.

The present invention will be better understood and its numerous objects and advantages will become apparent to those skilled in the art by referencing to the following drawings in which:

DETAILED DESCRIPTION OF THE PREFERRED EMBODIMENT

Figure 1:
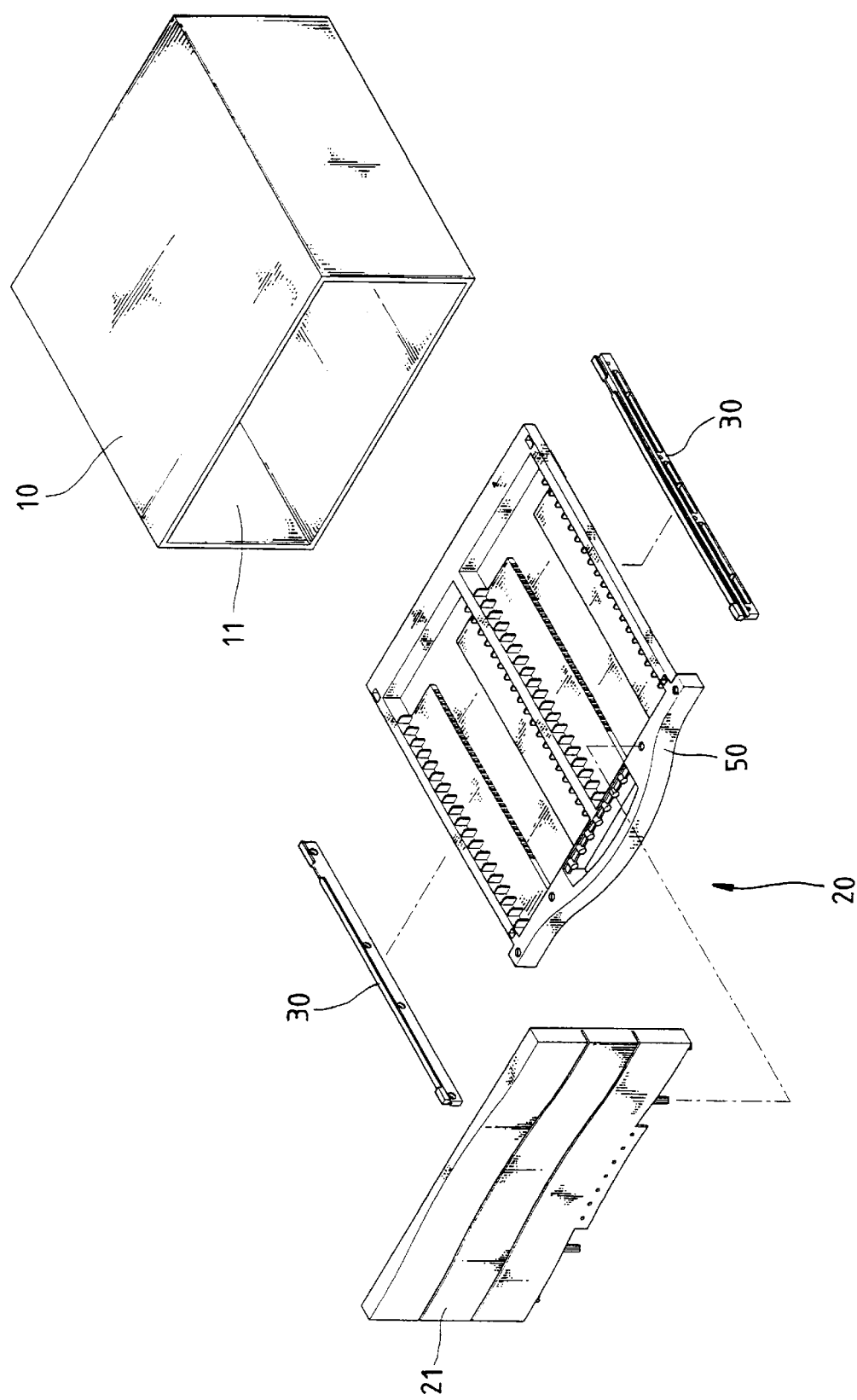
FIG. 1 is the exploded view of the components of the present invention.
Figure 2:
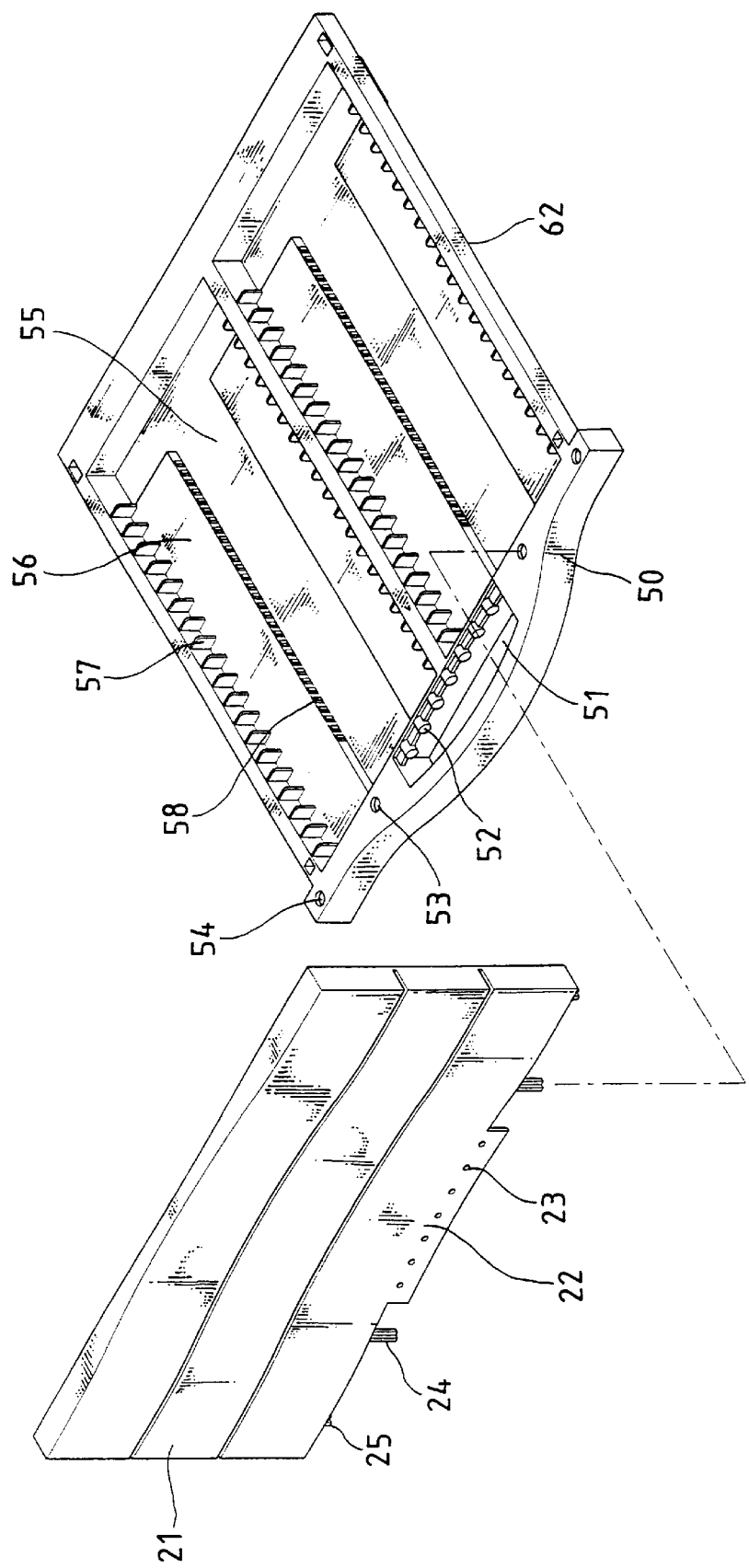
FIG. 2 is the structural exploded view of the drawer in the present invention.
Figure 3:
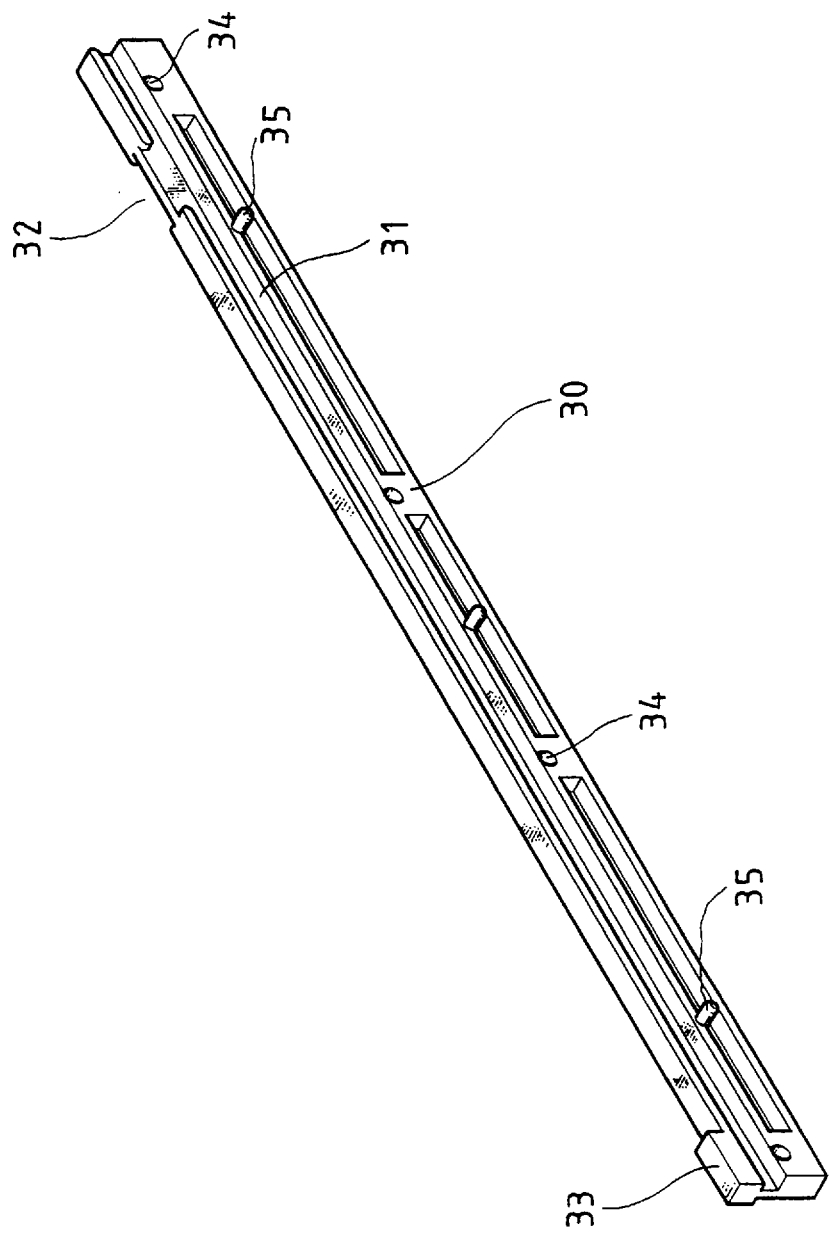
FIG. 3 is a schematic view of the outer appearance of the sliding track in the present invention.

Referring now to FIGS. 1 to 3, the present invention includes a box 10. The front opening 11 of the box 10 engages with a drawer 20. The drawer 20 is formed by a drawer front plate 21 and a base plate 50. A short flange 22 is installed on the lower edge in the middle of the drawer front plate 21, and the short flange 22 has a plurality of through holes 23. A long pillar and a short pillar 24 and 25, respectively, are installed at appropriate locations with the short flange 22 on the lower edge of the drawer front plate.

The front edge of the base plate 50 has a cambered handle projected form the plate body which has a handle hole 51. A plurality of equally spaced tenons 52 are installed on the inner side of the handle hole 51, and a long pin hole 53 and a ping hole 54 with different depths are installed at an appropriate distance from the handle hole 51 for engaging with the long and short pillars 24 and 25 for forming a drawer. Right and left lower receiving spaces 55 are provided on the panel surface of the base plate. On the two sides of the receiving spaces 55 two opposite convex plates 56 are provided that have equally spaced tenons 57. A plurality of positioning holes 58 are provided on the surface of the convex plate 56, and sliding slots 62 are provided on the lower edge of the two sides of the base plate. The front and rear edges of the sliding slot 62 are molded with small through holes above front and rear positioning tenons 59 and 60 that are arranged on the lower edge of the slot. A stop block 61 is installed on the distal end of the sliding slot 62. (See FIGS. 2 and 4).

The upper edges or upper part of sliding bars 30 have an approximately T-shaped cross section. A projecting block 33 is provided at a front of the sliding bar 30, and an opening or a concave hole 32 is provided at an end of the sliding bar 33, where upper portion of the T-shaped cross section is removed. A plate body is formed on the side of the sliding track near the bar surface and arranged so that a sliding slot 31 is provided between the plate body and the bar surface. A plurality of screw holes 34 and tenons 35 are installed on the plate body.

Figure 4:
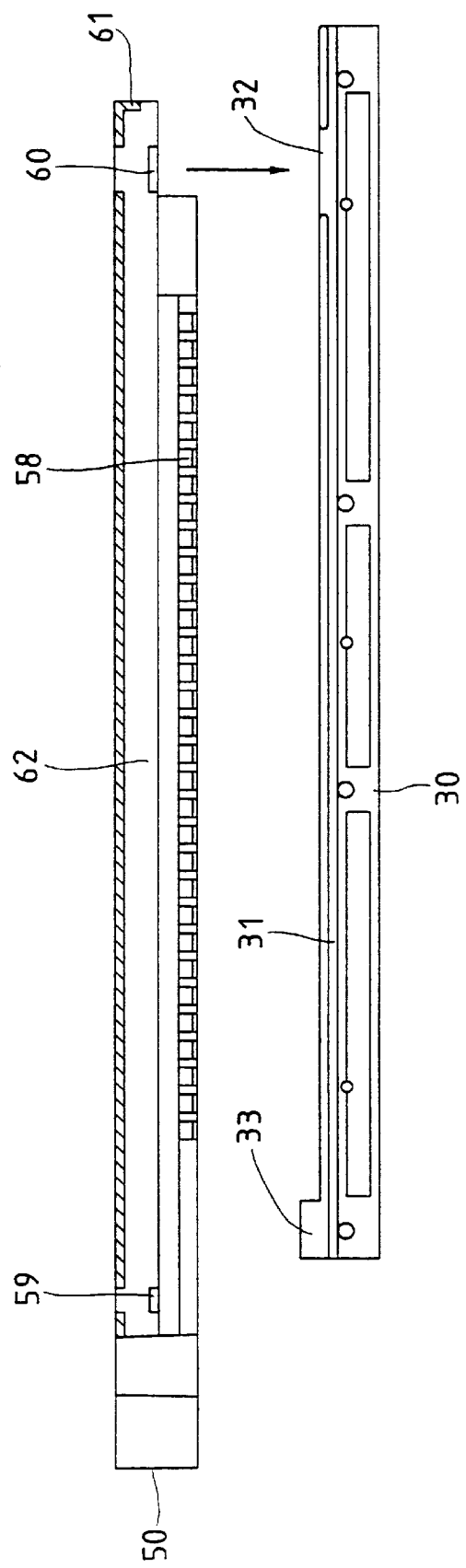
FIG. 4 is an exploded view showing the combined action of the base plate and the sliding bar in the present invention.
Figure 5:
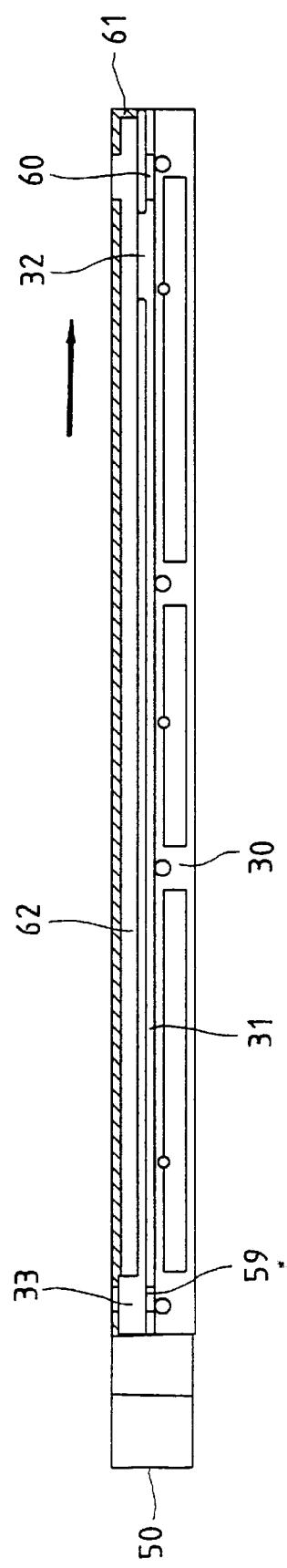
FIG. 5 is a cuss section view showing the combination of the base plate and the sliding bar in the present invention.

Now referring to FIGS. 4 and 5, the sliding bars 30 are installed on the lower edge of the two sides of the box 10 by the tenons 30 and screws passing through the screw holes 34 and screwed into the inside of the box 10. As the drawer 20 and the box 10 are aligned to be combined together, it is only necessary to insert the base plate 50 into the opening 11 of the box so that the sliding slots 62 on the two sides of the base plate 50 are located on the sliding bar 30, and then to push base plate 50 rearward until the rear positioning tenons 60 near the tail end of the sliding slot 32 are aligned with the concave holes 32 near the end of the sliding bars 30. In this arrangement the projecting block 33 on the front end of the sliding bar 30 is coupled with the sliding slot 62, so that the sliding slot 31 will couple with the positioning tenons 59 on the front end of the base plate. As the drawer 20 is pulled again, the front and rear positioning tenons 59 and 60 on the sliding slot 62 will move along the sliding track 31 of the sliding bar 31, and the stop block 61 on the distal end of the sliding slot 62 will be hindered by the projecting block 33 of the sliding bar 30, and thus the drawer 20 will not disengage from the box at the end of its travel.

Figure 6:
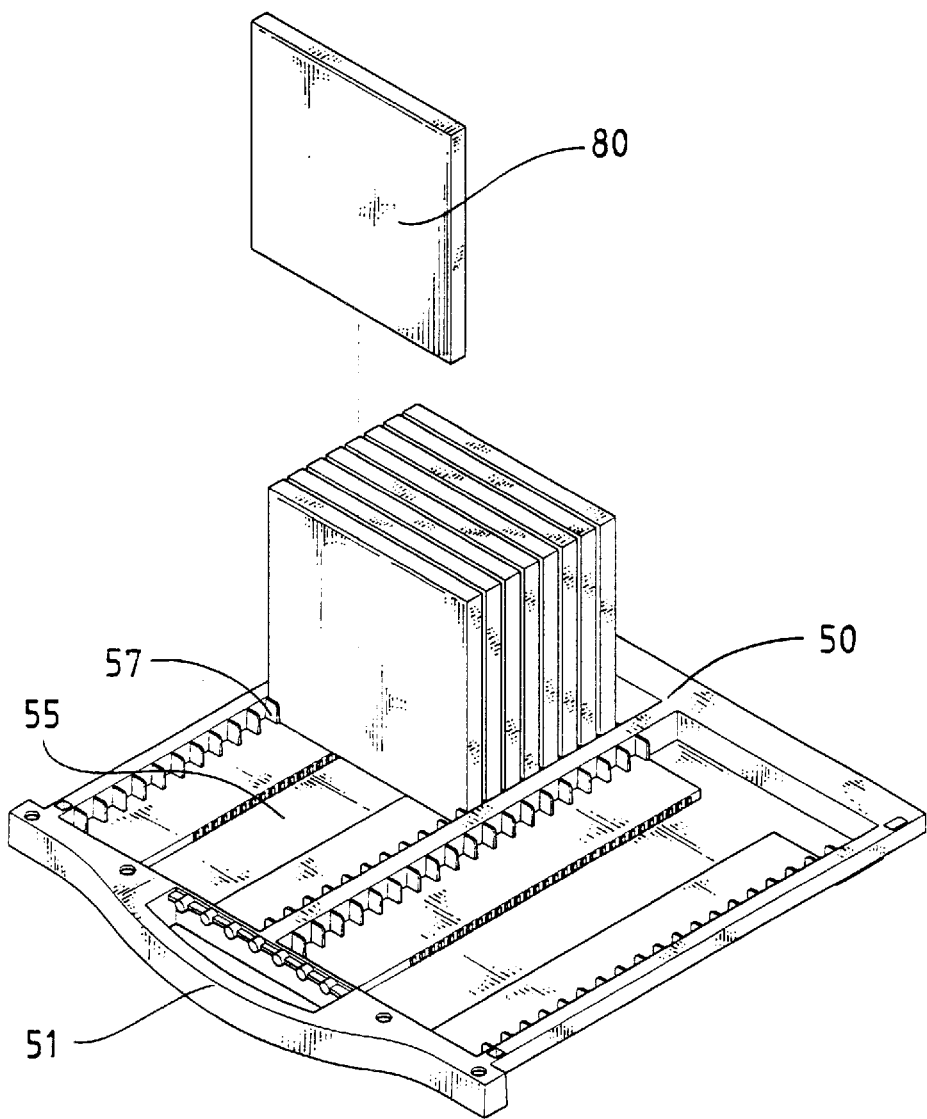
FIG. 6 is a schematic view showing a use of the present invention.
Figure 7:
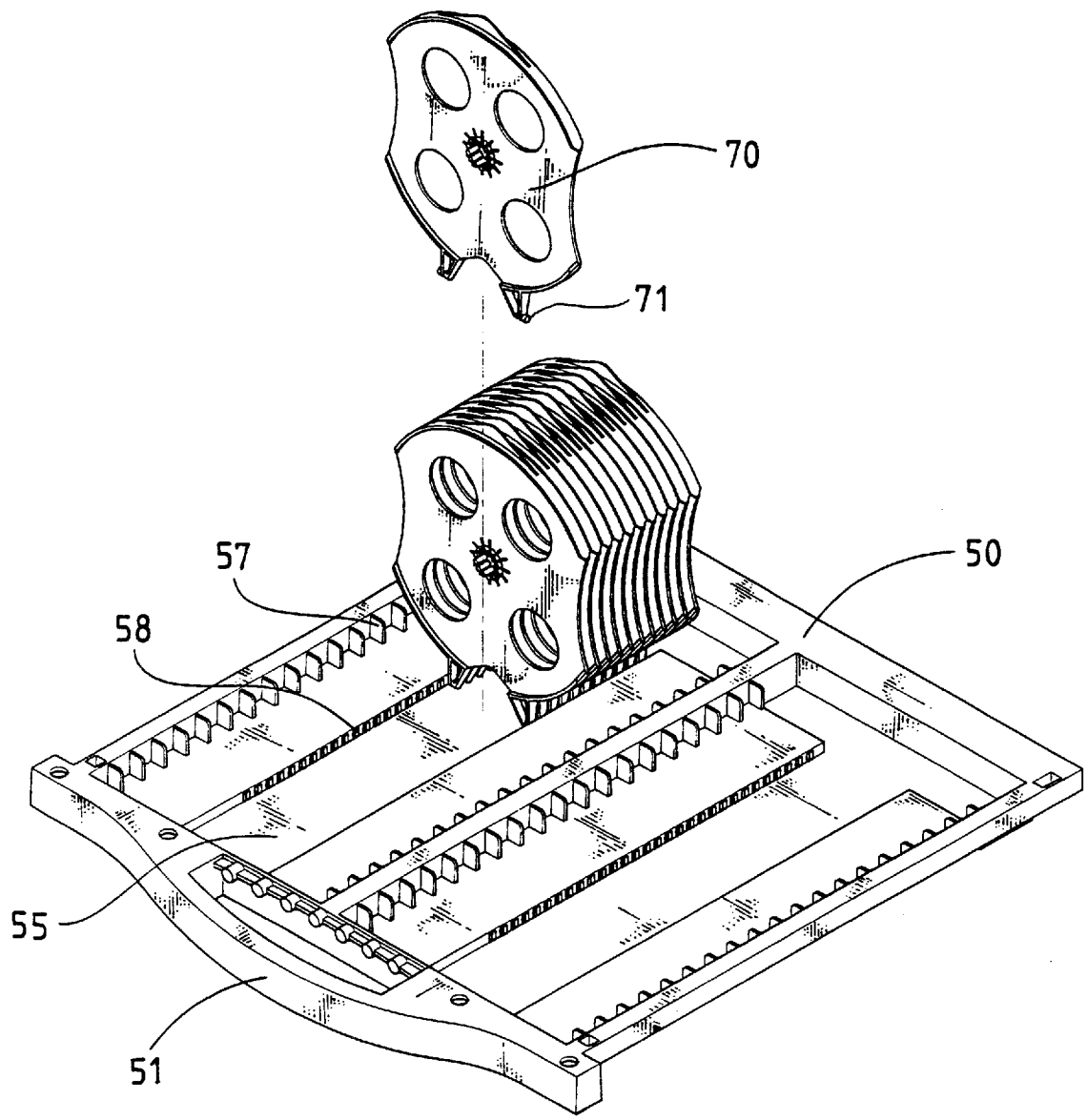
FIG. 7 is another schematic view showing a use of an embodiment in the present invention.

As shown in FIG. 6, the CD 80 together with its case or holder can be held between the spacing tenons 57 of the drawer 20. Referring to FIG. 7, some CDs or optic disks that have no packet or holder can be stored by turning supports 70 which are formed by the combination of the tenons 71 of the lower end thereof and the positioning holes 58 on the base plate to form an effect of automatically turning pages.

In summary, the present invention can be widely used to store all kinds of CDs, disks, audio tapes and video tapes and may be also used to store CDs and optic disks having no case, and the drawer will not drop from the track of the box when opened.

Although certain preferred embodiment of the present invention have been shown and described in detail, it should be understood that various changes and modification may be made therein without departing from the scope of the appended claims.

What is claimed is:

1. A CD holder comprising a box and a drawer, the box having an inside with a sliding track for slidable holding the drawer;

the drawer including a drawer panel and a base plate, the drawer panel having a bottom with a middle and two ends, a flange arranged at the bottom middle of the drawer panel, short pillars provided at the ends of the bottom of the drawer panel, and long pillars provided between the short pillars and the flange on the bottom of the drawer panel, the flange including a plurality of through holes;

the base plate including a plate body with a front end and two sides, a cambered handle projecting forward from the front end, receiving spaces provided in the plate body, hollow sliding slots respectively arranged on lower ends of the two sides, the hollow sliding slots having a front end and a rear end with a distal end, front and rear positioning tenons are respectively installed on the front and rear ends of the hollow sliding slots, and a stopping block is provided at the distal end of the hollow sliding slot, the sliding track including a sliding bar having a upper part with a T-shaped cross section extending a length of the sliding bar, a plate body arranged below the upper part and extending the length of the sliding bar, a front end and a rear end; the upper part and the plate body of the sliding bar are arranged to form a sliding track therebetween for receiving the sides of the base plate of the drawer, a projecting block extending upward from the T-shaped cross section at the front end of the sliding bar, an opening provided in the T-shaped cross section at the rear end of the sliding bar, and a plurality of screw holes and tenons are installed on the plate body; the projecting block and the opening cooperating to secure the hollow sliding slot of the base plate of the drawer to the sliding bar, for permitting sliding of the drawer relative to the box, and for inhibiting removal of the drawer from the box.

2. The CD holder as claimed in claim 1, wherein the base plate handle has pin holes with a depth matching a length of the long and short pillars of the drawer panel.

3. The CD holder as claimed in claim 1, wherein the receiving space of the base plate has positioning holes adapted to engage supports for holding CDs.

* * * * *